United States Patent
Lee et al.

(10) Patent No.: US 7,895,408 B2
(45) Date of Patent: Feb. 22, 2011

(54) METHOD, MEDIUM AND APPARATUS MANAGING MEMORY

(75) Inventors: Jae-don Lee, Paju-si (KR); Seung-won Lee, Hwaseong-si (KR); Jeong-joon Yoo, Yongin-si (KR); Young-sam Shin, Yongin-si (KR); Min-kyu Jeong, Seoul (KR); Keun-soo Yim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 12/004,068

(22) Filed: Dec. 20, 2007

(65) Prior Publication Data

US 2008/0168210 A1    Jul. 10, 2008

(30) Foreign Application Priority Data

Jan. 5, 2007   (KR) .................... 10-2007-0001700

(51) Int. Cl.
*G06F 12/00* (2006.01)
(52) U.S. Cl. ..................................... 711/170
(58) Field of Classification Search ................. None
See application file for complete search history.

(56) References Cited

U.S. PATENT DOCUMENTS

| 5,765,187 | A  * | 6/1998 | Shimizu et al. ............. 711/110 |
| 7,181,585 | B2 * | 2/2007 | Abrashkevich et al. ...... 711/170 |
| 7,512,765 | B2 * | 3/2009 | Kurtz ........................... 711/170 |
| 2007/0168739 | A1 * | 7/2007 | Wang et al. ................... 714/36 |

* cited by examiner

*Primary Examiner*—Hiep T Nguyen
(74) *Attorney, Agent, or Firm*—Staas & Halsey LLP

(57) ABSTRACT

A method and apparatus for managing a memory are provided. It is possible to rapidly recover the area allocated or desired to be returned by easily recognizing a range of the area allocated or desired to be returned over the entire area of the memory by recognizing an original area of a predetermined memory chunk interrupted by a neighboring memory chunk among a series of memory chunks that make up the memory by considering an original area of the neighboring memory chunk and by recovering the predetermined memory chunk and the recognized area to their original areas, when the area allocated to or returned by an application program is interrupted.

11 Claims, 4 Drawing Sheets

METHOD, MEDIUM AND APPARATUS MANAGING MEMORY

CROSS-REFERENCE TO RELATED APPLICATIONS

This application claims the benefit of Korean Patent Application No. 10-2007-0001700, filed on Jan. 5, 2007, in the Korean Intellectual Property Office, the disclosure of which is incorporated herein in its entirety by reference.

BACKGROUND

1. Field

One or more embodiments of the present invention relate to management of a memory, and more particularly, to a method and apparatus for managing a memory for an embedded system having a light weighted memory.

2. Description of the Related Art

A computing device relies on a memory to execute various application programs. Partial areas in the memory are temporarily allocated to application programs to be executed. An area allocated to an application program should not overlap an area allocated to another application program. However, when an application program uses other areas in addition to an area allocated to the application program, an area allocated to another application program may unintentionally be interrupted. In this case, it is difficult for the application program to be normally executed, and it is preferable that the situation be rapidly resolved.

Accordingly, when a border of an area allocated to or desired to be returned by an application program is broken and when the area allocated or desired to be returned is interrupted by another application program that uses areas that exceed an area allocated to or desired to be returned by the application program, operations for rapidly recovering the interrupted area by easily detecting a range of the interrupted area over the entire area of the memory are required.

SUMMARY

One or more embodiments of the present invention provide a method of managing a memory capable of rapidly recovering an interrupted area by easily detecting a range of the interrupted area over the entire area of the memory, when a border of the area allocated to or desired to be returned by an application program is broken due to another application program that uses areas that exceed an area allocated to or desired to be returned by the application program.

One or more embodiments of the present invention provide an apparatus for managing a memory capable of rapidly recovering an interrupted area by easily detecting a range of the interrupted area over the entire area of the memory, when a border of the area allocated to or desired to be returned by an application program is broken due to another application program that uses areas that exceed an area allocated to or desired to be returned by the application program.

One or more embodiments of the present invention provide a computer-readable recording medium having embodied thereon a computer program for executing the method capable of rapidly recovering an interrupted area by easily detecting a range of the interrupted area over the entire area of the memory, when a border of the area allocated to or desired to be returned by an application program is broken due to another application program that uses areas that exceed an area allocated to or desired to be returned by the application program.

Additional aspects and/or advantages will be set forth in part in, the description which follows and, in part, will be apparent from the description, or may be learned by practice of the invention.

To achieve at least the above and/or other aspects and advantages, embodiments of the present invention include recognizing an original area of a predetermined memory chunk interrupted by a neighboring memory chunk among a series of memory chunks that make up the memory by considering an original area of the neighboring memory chunk, and recovering an area of the predetermined memory chunk to the recognized original area.

To achieve at least the above and/or other aspects and advantages, embodiments of the present invention include an erroneous area recognition unit to recognize an original area of a predetermined memory chunk interrupted by a neighboring memory chunk among a series of memory chunks which make up the memory by considering an original area of the neighboring memory chunk, and an erroneous chunk recovery unit to recover an area of the predetermined memory chunk to the recognized original area.

To achieve at least the above and/or other aspects and advantages, embodiments of the present invention include a computer-readable recording medium having stored thereon a computer program for executing a method of managing a memory, the method comprising: recognizing an original area of a predetermined memory chunk interrupted by a neighboring memory chunk among a series of memory chunks that make up the memory by considering an original area of the neighboring memory chunk, and recovering an area of the predetermined memory chunk to the recognized original area.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
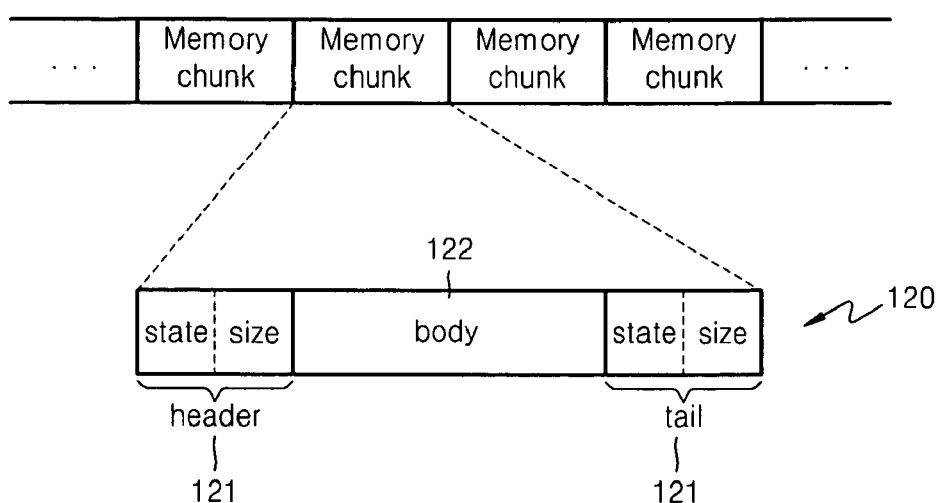
FIG. 1 illustrates a relation between a memory and memory chunks, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates a relation between a memory and memory chunks, according to an embodiment of the present invention. Specifically, FIG. 1 is a reference view illustrating a memory chunk that is a basic unit of an entity to be managed by the method, medium and apparatus managing a memory, according to an embodiment of the present invention.

A memory 110 may be constructed having a series of memory chunks 120. That is, the entire area of the memory 110 may be constructed to have a plurality of memory chunks 120. In one or more embodiments of the present invention, an area represents a space in which information may be written and included.

In an embodiment of the present invention, the memory 110 may be managed in units of memory chunks 120. Specifically, a basic unit of an entity to which an application program is allocated or returned may be a memory chunk.

The memory chunk 120 may be constructed with a non-management area 122 and at least one management area, e.g., management area, 121. As shown in FIG. 1, the management area 121 may be prepared on both sides of the non-management area 122. Unlike the embodiment illustrated in FIG. 1, the management area 121 may alternatively be prepared on only one side of the non-management area 122. For the convenience of description, hereinafter it is assumed that the management area is prepared on both sides of the non-management area 122. However, as shown in FIG. 1, when the management area 121 is prepared on both sides of the non-management area 122, information included in a first management area existing at a first end of the non-management area, may be the same as information included in the second management area existing at the second end of the non-management area, except for the case where the area of the memory chunk 120 is interrupted by an area of a neighboring memory chunk.

In an embodiment illustrated in FIG. 1, a body indicates a non-management area, a header indicates a management area prepared on one side of the non-management area, and a tail indicates the other management area prepared on the other side of the non-management area.

The unit "state" may indicate a state of the memory chunk 120. The state of the memory chunk 120 may be, for example, an allocated state or returned state.

On the other hand, the unit "size" may indicate a predetermined data capacity (for example, size may have a unit of bytes) of the non-management area. The data capacity of the non-management area may be variable depending on the memory chunk 120. The data capacity of the management area is typically constant with respect to the memory chunk 120. For example, in an embodiment, the predetermined data capacity of the management area for representing the state of the memory chunk 120 is always 1 byte. In an embodiment, the predetermined data capacity of the management area for representing the predetermined data capacity of the non-management area is always 4 bytes. Here, the predetermined data capacity of the management area prepared on the first side of the non-management area and the predetermined data capacity of the management area prepared on the second side of the non-management area are 5 bytes.

The management area is generally connected to at least one end of the non-management area. The unit "size" included in the management area may directly indicate the predetermined data capacity of the non-management area and may indirectly indicate the predetermined data capacity of the memory chunk 120. Accordingly, the unit "size" included in the management area may indicate the area of the memory chunk 120. That is, the unit "size" included in the management area may indicate the range of the memory chunk 120 over the entire memory.

Figure 2:
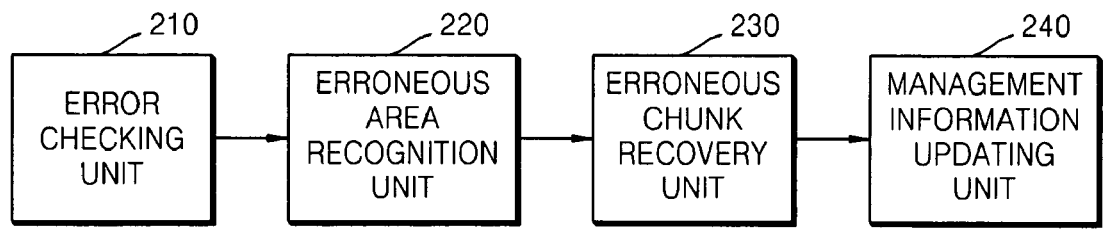
FIG. 2 illustrates an apparatus for managing a memory, according to an embodiment of the present invention.

FIG. 2 illustrates an apparatus for managing a memory, according to an embodiment of the present invention. The apparatus for managing the memory may include, for example, an error checking unit 210, an erroneous area recognition unit 220, an erroneous chunk recovery unit 230, and a management information updating unit 240.

The error checking unit 210 may start to operate when an application program requests a memory chunk to be allocated or returned.

The error checking unit 210 may check whether an error exists in a predetermined memory chunk. In an embodiment of the present invention, the predetermined memory chunk may indicate one of a plurality of memory chunks which make up a memory. Specifically, the predetermined memory chunk may indicate a memory chunk desired to be allocated to the application program or a memory chunk desired to be returned by the application program. Typically, the existence of an error in the memory chunk indicates that the area of the memory chunk has been disrupted by an area of a memory chunk adjacent to the memory chunk.

The error checking unit 210 may analyze a management area (more particularly, a state represented by the management area) of a predetermined memory chunk so as to check (i.e., determine) whether an error exists in the predetermined memory chunk.

When the predetermined memory chunk is a memory chunk desired to be returned by the application program, the error checking unit 210 may determine whether the management area of the predetermined memory chunk indicates that the memory chunk has been returned. When it is determined that the management area of the predetermined memory chunk indicates that the memory chunk has been returned, the error checking unit 210 generally recognizes that there is no error in the predetermined memory chunk. On the other hand, when it is determined that the management area of the predetermined memory chunk does not indicate that the memory chunk has been returned, such as when it is determined that the management area of the predetermined memory chunk represents that the memory chunk is allocated or when it is determined that the management area of the predetermined memory chunk represents information other than that the memory chunk is allocated and that the memory chunk has been returned, the error checking unit 210 generally recognizes that an error exists in the predetermined memory chunk.

Similarly, when the predetermined memory chunk is a memory chunk desired to be allocated to the application program, the error checking unit 210 may determine whether the management area of the predetermined memory indicates that the memory chunk has been allocated. When it is determined that the management area of the predetermined memory chunk indicates that the memory chunk has been allocated, the error checking unit 210 generally recognizes that there is no error in the predetermined memory chunk. On the other hand, when it is determined that the management area of the predetermined memory chunk does not indicate that the memory chunk has been allocated, such as when it is determined that the management area of the predetermined memory chunk represents that the memory chunk has been returned or when it is determined that the management area of the predetermined memory chunk represents information other than that the memory chunk is allocated and that the memory chunk is returned, the error checking unit 210 generally recognizes that an error exists in the predetermined memory chunk.

The erroneous area recognition unit 220 may operate only after the error checking unit 210 has determined that an error exists in the predetermined memory chunk. That is, the erroneous area recognition unit 220 may operate in response to the checking result obtained by the error checking unit 210. A detailed operation of the erroneous area recognition unit 220 will now be described.

The erroneous area recognition unit 220 may recognize an area of the predetermined memory chunk. Specifically, the erroneous area recognition unit 220 may recognize which area in the entire memory is the area of the predetermined memory chunk.

The erroneous area recognition unit 220 may analyze management areas of at least one memory chunk adjacent to the predetermined memory chunk. For example, the erroneous area recognition unit 220 may analyze a management area of a memory chunk adjacent to a front end of the predetermined memory chunk. Here, the erroneous area recognition unit 220 may analyze the unit "size" included, e.g., in a tail of the management area of the memory chunk adjacent to the front end. In addition, the erroneous area recognition unit 220 may also analyze a management area of a memory chunk adjacent to a back end of the predetermined memory chunk. Here, the erroneous area recognition unit 220 may analyze the unit "size" of a header management area of the memory chunk adjacent to the back end.

The erroneous chunk recovery unit 230 may recover a predetermined memory chunk which is determined to be erroneous by the error checking unit 210. Specifically, the erroneous chunk recovery unit 230 may recover the area of the predetermined memory chunk to an appropriate area recognized by the erroneous area recognition unit 220. Accordingly, even though a border of the area of the predetermined memory chunk has been broken due to an interruption of the area by the memory chunk adjacent to the predetermined memory chunk, the border of the area of the predetermined memory chunk may be completely recovered.

In addition, the erroneous chunk recovery unit 230 may consider a recovery policy set in the apparatus for managing the memory, according to an embodiment of the present invention, when recovering the predetermined memory chunk.

For example, when the set recovery policy requires immediate recovery, the erroneous chunk recovery unit 230 may recover the predetermined memory chunk immediately when the erroneous area recognition unit 220 recognizes the appropriate area of the predetermined memory chunk.

On the other hand, when the set recovery policy requires later recovery, even if the erroneous area recognition unit recognizes the appropriate area of the predetermined memory chunk, the erroneous chunk recovery unit 230 may delay recovery of the predetermined memory chunk. The predetermined memory chunk of which recovery is delayed may be combined with the memory chunk that interrupts the area of the predetermined memory chunk and may be stored in a recovery chunk storage unit (not shown). The recovery chunk storage unit (not shown) may be included in the apparatus for managing the memory according to an embodiment of the present invention. On the other hand, each management area obtained by combining the predetermined memory chunk with the memory chunk which interrupts the area of the predetermined memory chunk may represent that the memory chunk is ready to be recovered.

When the recovery of the predetermined memory chunk is delayed, the erroneous chunk recovery unit 230 may recover the predetermined memory chunk in response to a recovery instruction signal. A recovery control unit (not shown) included in the apparatus for managing the memory, according to the embodiment of the present invention, may analyze a usage situation of the entire area of the memory and generate the recovery instruction signal based on the analysis result. For example, when it is determined that the number of allocable memory chunks is less than a threshold by an analysis of the usage situation, the recovery control unit (not shown) may generate the recovery instruction signal, and the erroneous chunk recovery unit 230 may recover the predetermined memory chunk.

The management information updating unit 240 updates information included in the management area of the recovered predetermined memory chunk in correspondence with the predetermined memory chunk. On the other hand, when the error checking unit 210 determines that there is no error in the predetermined memory chunk, the management information updating unit 240 may update the information included in the management area of the predetermined memory chunk checked to indicate the predetermined memory chunk is not erroneous by the error checking unit 210 in correspondence with the predetermined memory chunk.

For example, when the predetermined memory chunk is a memory chunk desired to be allocated to the application program, the management information updating unit 240 may set information included in the management area of the recovered predetermined memory chunk so that the management area of the recovered predetermined memory chunk indicates that the memory chunk is allocated.

Similarly, when the predetermined memory chunk is a memory chunk desired to be returned by the application program, the management information updating unit 240 may set the information included in the management area of the recovered predetermined memory chunk so that the management area of the recovered predetermined memory chunk indicates that the memory chunk is returned.

Figure 3:
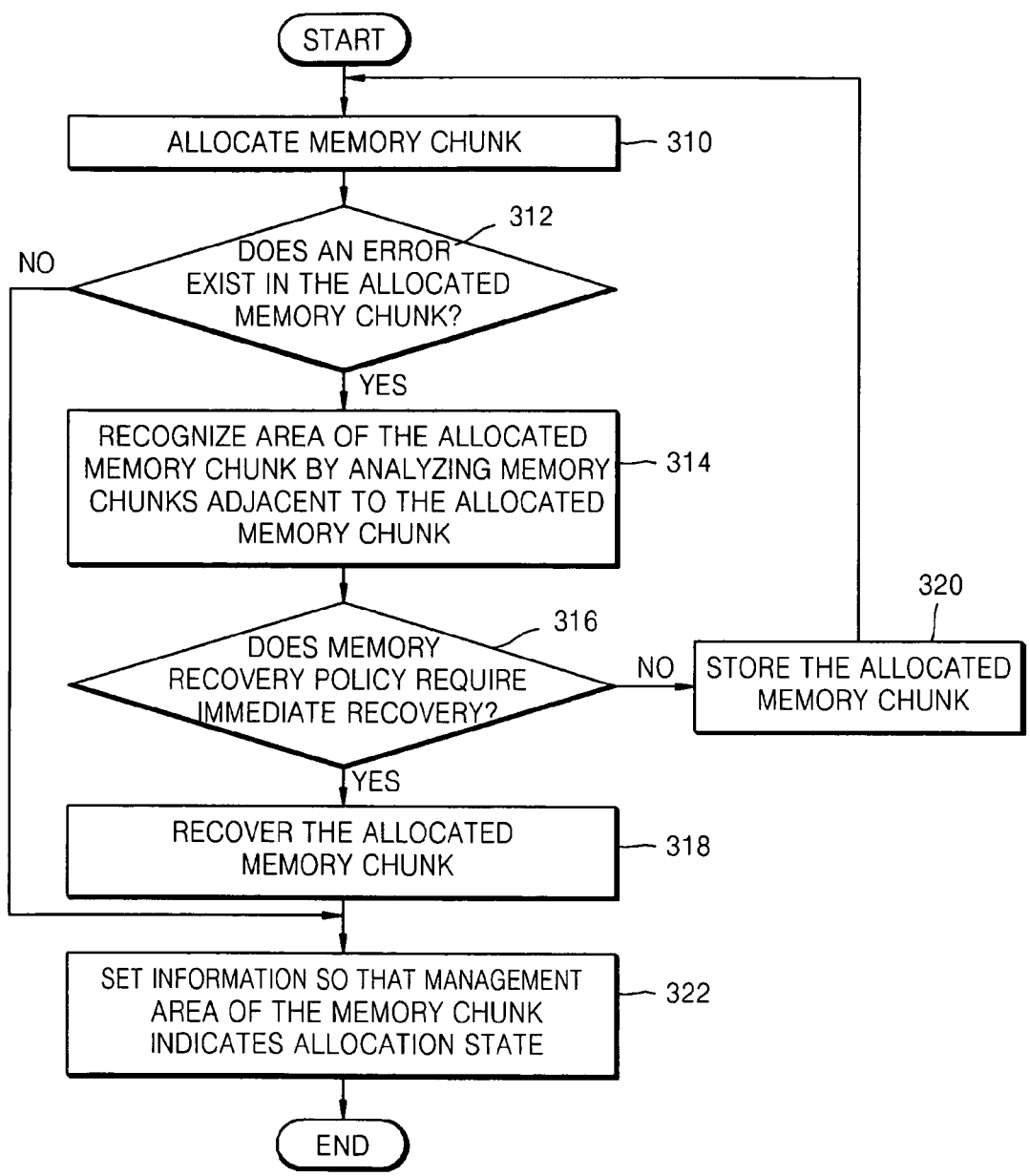
FIG. 3 illustrates a method of managing a memory, according to an embodiment of the present invention, when a memory chunk is allocated.

FIG. 3 illustrates a method of managing a memory when a memory chunk is allocated, according to an embodiment of the present invention. When a border of an area allocated to an application program is broken because another application program has used an area that exceed an area allocated thereto, the method of managing the memory may include operations (e.g., operations 310 through 322) that provide rapid recovery of the allocated area by detecting a range of the allocated area over the entire area of the memory.

In operation 310, one of a plurality of memory chunks that make up the memory may be allocated to the application program when the application program requests the memory chunk to be allocated.

In operation 312, it may be determined whether an error exists in the memory chunk allocated in operation 310, e.g., by the error checking unit 210.

In operation 314, the appropriate area of the memory chunk allocated in operation 310 by analyzing management areas of at least one memory chunk adjacent to the allocated memory chunk may be recognized, e.g., by the erroneous area recognition unit 220, when it is determined in operation 312 that an error exists in the memory chunk.

In operation 216, it may be determined, e.g., by the erroneous chunk recovery unit 230, whether a predetermined recovery policy requires immediate recovery of the memory chunk determined to be erroneous in operation 312.

In operation 318, the area of the memory chunk determined to be erroneous in operation 312 may be recovered, e.g., by the erroneous chunk recovery unit 230, to the appropriate area recognized in operation 314, when it is determined in operation 316 that the immediate recovery is required.

Alternatively, when it is determined in operation 316 that the immediate recovery is not required, the memory chunk determined to be erroneous in operation 312 may be combined with the memory chunk which interrupts the area of the memory chunk determined to be erroneous in operation 312 and the combined result may be stored in operation 320, e.g., by the recovery chunk storage unit (not shown). After operation 320, a memory chunk may be newly allocated to the application program.

In operation 322, the information included in the management area of the memory chunk recovered in operation 318 may be set so that the management area of the memory chunk recovered in operation 318 indicates that the memory chunk has been allocated, e.g., by the management information updating unit 240.

On the other hand, when it is determined in operation 312 that there is no error, the information included in the management area of the memory chunk allocated in operation 310 may be set so that the management area of the memory chunk allocated in operation 310 indicates that the memory chunk has been allocated in operation 322, e.g., by the management information updating unit 240.

Figure 4:
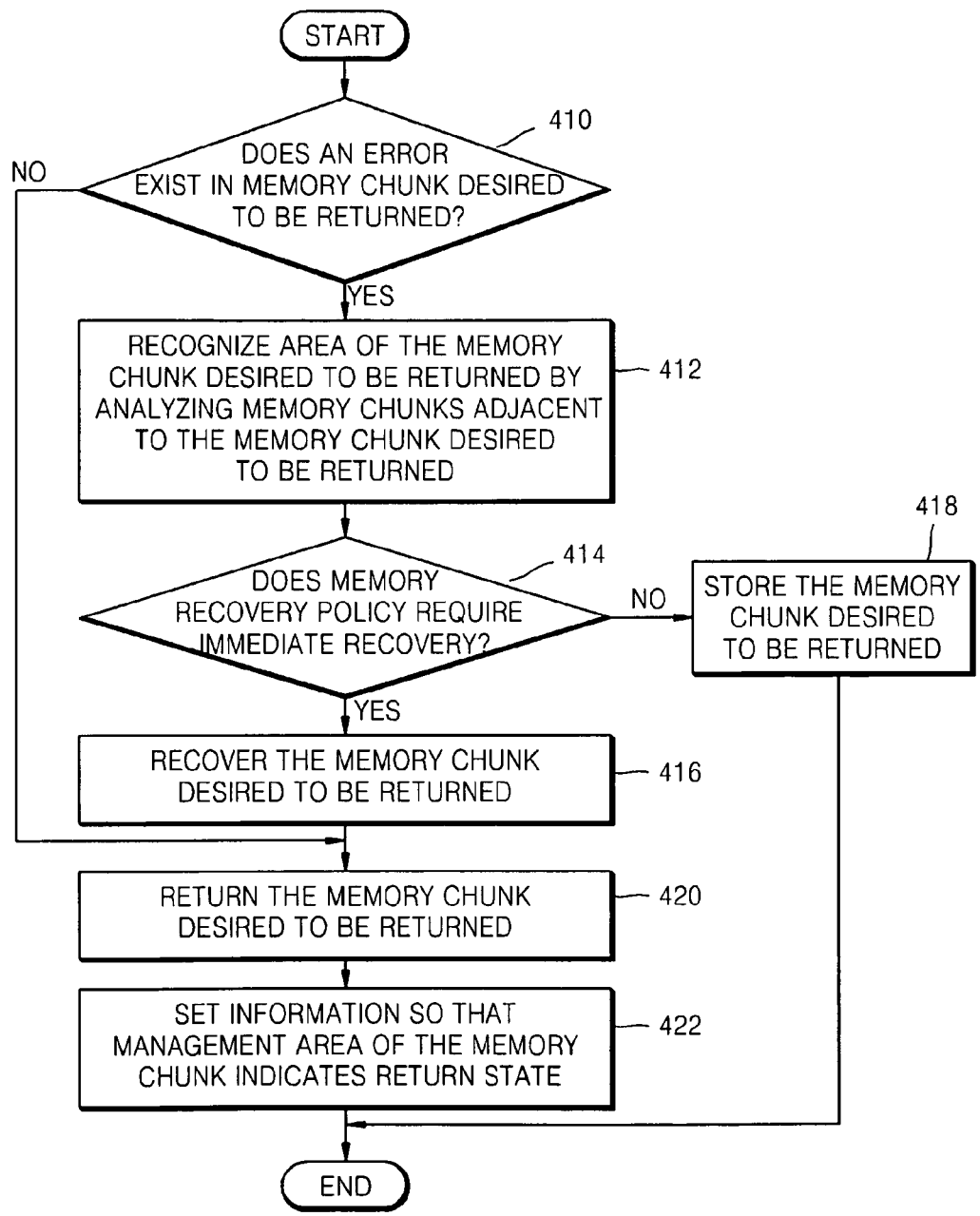
FIG. 4 illustrates a method of managing a memory, according to an embodiment of the present invention, when a memory chunk is returned.

FIG. 4 illustrates a method of managing a memory to return a memory chunk, according to an embodiment of the present invention. When a border of an area desired to be returned by an application program is broken because another application program has used an area that exceed an area allocated thereto, the method of managing the memory may include operations (e.g., operations 410 through 424) that provide rapid recovery of the area desired to be returned by detecting the range of the area desired to be returned by the application program over the entire area of the memory.

In operation 410, it may be determined whether an error exists in the memory chunk desired to be returned e.g., by the error checking unit 210, when the application program desires to return the memory chunk.

In operation 412, when it is determined in operation 410 that an error exists, the area of the memory chunk desired to be returned may be recognized by analyzing management areas of at least one memory chunk adjacent to the memory chunk desired to be returned, e.g., by the erroneous area recognition unit 220.

In operation 414, it may be determined whether a predetermined recovery policy requires immediate recovery of the memory chunk determined to be erroneous in operation 410, e.g., by the erroneous chunk recovery unit 230.

In operation 416, when it is determined that the immediate recovery is required, the erroneous chunk recovery unit 230 may recover the area of the memory chunk determined to be erroneous in operation 410 to the area recognized in operation 412.

On the other hand, when it is determined in operation 414 that the immediate recovery is not required, the memory chunk determined to be erroneous in operation 410 may be combined with the memory chunk which interrupts the area of the memory chunk determined to be erroneous in operation 410 and the combined result stored, e.g., by the recovery chunk storage unit (not shown) in operation 418.

After operation 416, the application program returns the memory chunk recovered in operation 416. Similarly, when it is determined in operation 410 that there is no error, the application program returns the memory chunk desired to be returned in operation 420.

In operation 422, information included in the management area of the memory chunk returned in operation 420 may be set so that the management area of the memory chunk returned in operation 420 indicates that the memory chunk has been returned, e.g., by the management information updating unit 240.

Figure 5:
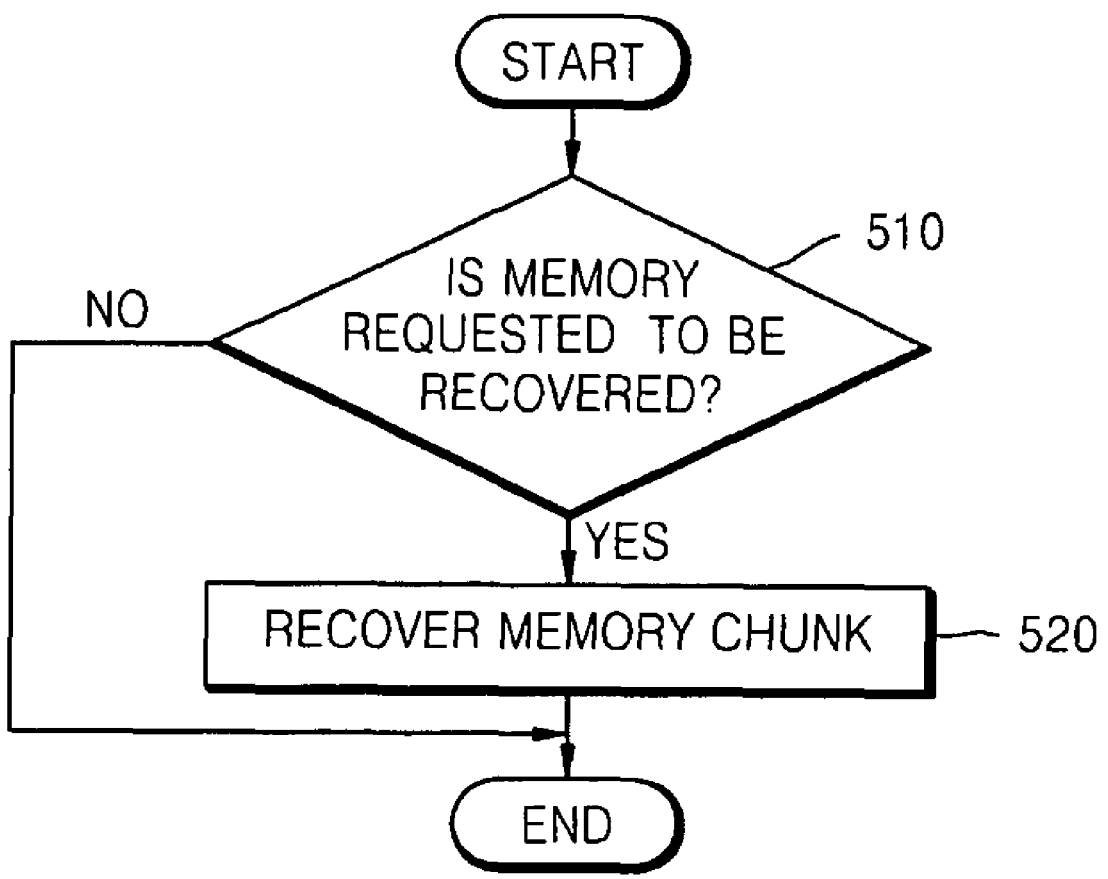
FIG. 5 illustrates a method of managing a memory, according to a recovery policy which requires later recovery, according to an embodiment of the present invention.

FIG. 5 illustrates a method of managing a memory, according to a recovery policy which requires subsequent recovery.

In operation 510, it may be determined, e.g., by the recovery control unit (not shown), whether a usage situation of the entire area of the memory is the same as a predetermined usage situation. An example of the predetermined usage situation is a situation in which the number of allocable memory chunks is less than a threshold. Operation 510 may be repeatedly performed until it is determined that the usage situation of the entire area of the memory is the predetermined usage situation.

In operation 520, the area of the memory chunk determined to be erroneous in operation 312 of FIG. 3 or in operation 410 of FIG. 4 may be recovered, e.g., by the erroneous chunk recovery unit 230, when it is determined in operation 510 that the usage situation of the entire area of the memory is the predetermined usage situation.

As described above, in the method, medium and apparatus managing a memory, the entire area of the memory is partitioned into a plurality of areas and managed. That is, in the method, medium and apparatus managing the memory, the memory is treated as a plurality of memory chunks. Here, a memory chunk according to an embodiment of the present invention may be provided with a management area for representing a data capacity and a state of the memory chunk on one side or both sides of a non-management area.

Accordingly, in the method, medium and apparatus managing a memory according to an embodiment of the present invention, when a border of an area allocated to or desired to be returned by an application program is broken and when the area allocated or desired to be returned is interrupted because another application program uses an area that exceeds an area allocated to, or desired to be returned by, the application program, it may be possible to recognize whether a border of the area allocated, or desired to be returned, is broken only by analyzing a management area of the area allocated or desired to be returned. That is, in the apparatus for managing a memory, according to an embodiment of the present invention, when the area allocated to or desired to be returned by the application program is interrupted, that is, when an error exists in the memory chunk allocated to or desired to be returned by the application program, it may be possible to easily recognize whether a border of the area allocated or desired to be returned is broken.

Furthermore, in the method, medium and apparatus managing a memory according to an embodiment of the present invention, when a border of an area allocated to or desired to be returned by an application program is broken and when the area allocated to or desired to be returned is interrupted because another application program uses areas that exceed an area allocated to or desired to be returned by the application program, it may be possible to rapidly recovering the area allocated or desired to be returned since the range of the area allocated or desired to be returned in the entire area of the memory is easily detected by analyzing data capacities represented in management areas of at least one area adjacent to the area allocated or desired to be returned. That is, in the method, medium and apparatus managing a memory according to an embodiment of the present invention, when it is recognized that the error exists in the memory chunk, it may be possible to rapidly recover a memory chunk required to be recovered by easily recognizing the range of the memory chunk to be recovered, in which an error exists in the memory.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of managing a memory comprising a plurality of memory chunks, the method comprising:
   recognizing whether an original area of a predetermined memory chunk has been interrupted, each of the memory chunks comprising a non-management area and management areas connected to both ends of the non-management area, each of the management areas having information indicating a state of the memory chunk and information indicating a data capacity of the non-management area, and an original area of the memory chunk is indicated in the management area by checking the management areas; and
   recovering an interrupted area of the predetermined memory chunk, by using at least one memory chunk adjacent to the predetermined memory chunk.

2. The method of claim 1,
   wherein in the management area of the memory chunk, it is further indicated whether an error exists in the memory chunk, and
   wherein the method of managing the memory further comprises determining whether an error exists in the predetermined memory chunk by analyzing the management area of the predetermined memory chunk and proceeding to the recognizing the original area of the predetermined memory when it is determined that the error exists in the predetermined memory chunk.

3. The method of claim 1, wherein in the management area of the memory chunk, an allocation or a return of the memory chunk is indicated.

4. The method of claim 1, further comprising:
   updating information included in the management area of the recovered area in correspondence with the predetermined memory chunk.

5. The method of claim 1, wherein the predetermined memory chunk is an allocated memory chunk or a memory chunk desired to be returned.

6. At least one non-transitory medium comprising computer readable code to control at least one processing element in a computer to implement the method of claim 1.

7. An apparatus for managing a memory comprising a plurality of memory chunks, the apparatus comprising:
   an erroneous area recognition unit to recognize whether an original area of a predetermined memory chunk has been interrupted, each of the memory chunks comprising a non-management area and management areas connected to both ends of the non-management area, each of the management areas having information indicating a state of the memory chunk and information indicating a data capacity of the non-management area, and an original area of the memory chunk is indicated in the management area by checking the management areas; and
   an erroneous chunk recovery unit to recover an interrupted area of the predetermined memory chunk, by using at least one memory chunk adjacent to the predetermined memory chunk.

8. The apparatus of claim 7,
   wherein the management area of the memory chunk further indicates whether an error exists in the memory chunk,
   wherein the apparatus for managing the memory further comprises an error checking unit checking whether an error exists in the predetermined memory chunk by analyzing the management area of the predetermined memory chunk, and
   wherein the erroneous area recognition unit operates in response to the checking result.

9. The apparatus of claim 7, wherein in the management area of the memory chunk, allocation or return of the memory chunk is indicated.

10. The apparatus of claim 7, further comprising a management information updating unit updating information included in the management area of the recovered area in correspondence with the predetermined memory chunk.

11. The apparatus of claim 7, wherein the predetermined memory chunk is an allocated memory chunk or a memory chunk desired to be returned.

* * * * *